United States Patent
Leduc et al.

(10) Patent No.: US 7,730,874 B2
(45) Date of Patent: Jun. 8, 2010

(54) METHOD FOR CONTROLLING A SUPERCHARGED ENGINE, PARTICULARLY AN INDIRECT INJECTION ENGINE, AND ENGINE USING SUCH A METHOD

(75) Inventors: Pierre Leduc, Beynes (FR); Gaétan Monnier, Rueil Malmaison (FR)

(73) Assignee: Institut Francais du Petrole, Rueill Malmaison, Cedex (FR)

( * ) Notice: Subject to any disclaimer, the term of this patent is extended or adjusted under 35 U.S.C. 154(b) by 704 days.

(21) Appl. No.: 10/581,558

(22) PCT Filed: Nov. 26, 2004

(86) PCT No.: PCT/FR2004/003049
§ 371 (c)(1),
(2), (4) Date: May 2, 2007

(87) PCT Pub. No.: WO2005/056992
PCT Pub. Date: Jun. 23, 2005

(65) Prior Publication Data
US 2007/0283694 A1 Dec. 13, 2007

(30) Foreign Application Priority Data
Dec. 2, 2003 (FR) .................................. 03 14212

(51) Int. Cl.
F02B 15/00 (2006.01)
F02B 33/00 (2006.01)
(52) U.S. Cl. .................................. 123/432; 123/559.1
(58) Field of Classification Search .................. 123/432, 123/559.1, 76
See application file for complete search history.

(56) References Cited

U.S. PATENT DOCUMENTS

| 2,701,556 | A | * | 2/1955 | Woerner | 123/432 |
| 4,217,866 | A | | 8/1980 | Nakajima | 123/76 |
| 4,488,531 | A | * | 12/1984 | Tadokoro et al. | 123/432 |
| 4,550,700 | A | * | 11/1985 | Yoshida et al. | 123/432 |
| 4,628,880 | A | * | 12/1986 | Aoyama et al. | 123/432 |
| 4,667,636 | A | * | 5/1987 | Oishi et al. | 123/432 |
| 4,703,734 | A | * | 11/1987 | Aoyama et al. | 123/432 |

(Continued)

FOREIGN PATENT DOCUMENTS

JP 59200017 A * 11/1984 ................. 123/432

(Continued)

*Primary Examiner*—Thai Ba Trieu
(74) *Attorney, Agent, or Firm*—Antonelli, Terry, Stout & Kraus, LLP.

(57) ABSTRACT

A method for controlling a supercharged engine, that includes determining an overlap of valves by opening a supercharged non-fuel-containing air inlet valve and closing an exhaust valve before the exhaust phase of an engine cylinder and in the vicinity of the top dead center (TDC), actuating a blocking means for blocking a supercharged non-fuel-containing air intake means to admit supercharged air flowing in the supercharged non-fuel-containing air intake means into a chamber to scavenge residual burned gases when a pressure of the supercharged non-fuel-containing air is greater than a pressure of the exhaust gases, and actuating the blocking means to shut off the supercharged air flowing from the supercharged non-fuel-containing intake means into the chamber when pressure of the supercharged non-fuel-containing air is less than pressure of the exhaust gases.

7 Claims, 3 Drawing Sheets

U.S. PATENT DOCUMENTS

| | | | | |
|---|---|---|---|---|
| 4,785,635 | A | * | 11/1988 | Melchior et al. .............. 60/606 |
| 4,809,649 | A | * | 3/1989 | Brinkman .................... 123/432 |
| 4,998,513 | A | * | 3/1991 | Gagnon ....................... 123/432 |
| 5,230,320 | A | * | 7/1993 | Hitomi et al. ............... 123/432 |
| 5,239,960 | A | * | 8/1993 | Sasaki et al. ................ 123/432 |
| 5,549,095 | A | * | 8/1996 | Goto et al. ............... 123/559.1 |
| 6,470,681 | B1 | * | 10/2002 | Orton ....................... 123/559.1 |
| 6,877,723 | B2 | * | 4/2005 | Martinsson et al. ....... 123/73 R |
| 7,025,041 | B2 | * | 4/2006 | Abe et al. ................... 123/432 |
| 7,082,764 | B2 | * | 8/2006 | Lecointe et al. ............. 123/432 |
| 2006/0272623 | A1 | * | 12/2006 | Pagot ......................... 123/432 |
| 2008/0308077 | A1 | * | 12/2008 | Pagot ...................... 123/559.1 |
| 2009/0063023 | A1 | * | 3/2009 | Nagae ........................ 701/108 |

FOREIGN PATENT DOCUMENTS

| | | | | | |
|---|---|---|---|---|---|
| JP | 62195414 | A | * | 8/1987 | |
| JP | 010336920 | A | * | 2/1989 | ................. 123/432 |
| JP | 03151532 | A | * | 6/1991 | ................. 123/432 |

* cited by examiner

Bringing about, by using a controller, before the exhaust phase of an engine cylinder, and in the vicinity of the top dead center (TDC), an overlap of the valves by opening the supercharged non-fuel-containing air inlet valve and closing the exhaust valve

---

Commanding, by using the controller, a blocking means for blocking the supercharged non-fuel-containing air intake means so as to admit supercharged air into the chamber to scavenge residual burned gases when a pressure of the supercharged non-fuel-containing air is greater than a pressure of the exhaust gases

---

Commanding by using the controller, said blocking means so as to close said supercharged non-fuel-containing intake means when pressure of the supercharged non-fuel-containing air is less than pressure of the exhaust gases

METHOD FOR CONTROLLING A SUPERCHARGED ENGINE, PARTICULARLY AN INDIRECT INJECTION ENGINE, AND ENGINE USING SUCH A METHOD

BACKGROUND OF THE INVENTION

The present invention relates to a method for controlling a supercharged engine, particularly an indirect injection engine, and an engine using such a method.

In general, the power delivered by an internal combustion engine is a function of the amount of air introduced into the combustion chamber of this engine, which quantity of air is itself proportional to the density of this air. As is known, this air can be compressed, by any compression means, such as a turbocompressor, before its admission into the engine cylinder in order to supercharge this cylinder with air.

In order to improve this filling with air still further, provision is made to evacuate the residual burned gases from the combustion chamber before the end of the exhaust phase of the engine, and replace them with supercharged air, a stage which is more commonly known as burned gas scavenging.

As is better described in U.S. Pat. No. 4,217,866, this scavenging is effected by having, at the end of the exhaust phase, an overlap phase between the exhaust and inlet valves of one cylinder. More specifically, this overlap is effected by simultaneously opening the exhaust and inlet valves, by several degrees to several tens of degrees of crankshaft rotation angle, near the top dead center (TDC). For this, a specific intake means is provided, comprised of a pipe and a valve, for supercharged non-fuel-containing air, in addition to a conventional intake means, also comprised of a pipe and a valve, provided to admit supercharged fuel-containing air into the combustion chamber. This burned gas scavenging is thus effected by overlapping the exhaust valve and the supercharged non-fuel-containing air valve. During this overlap, the exhaust valves remain open and supercharged non-fuel-containing air is admitted into the combustion chamber. This supercharged non-fuel-containing air, which is at a higher pressure than that of the burned gases, scavenges these gases and evacuates them through the exhaust valve or valves thus filling the space freed by these gases. At the end of scavenging, the exhaust valves close and supercharged fuel-containing air is introduced into the combustion chamber by another intake means which is provided with a fuel injector in the case of multipoint fuel injection.

This type of engine, although it gives satisfaction, nonetheless has several non-negligible drawbacks.

In certain operating modes of a multicylinder engine, especially at high speed and full load, a counter-scavenging phenomenon occurs in the cylinder and prevents the residual burned gases from evacuating. This counter-scavenging is generally due to the rising of a puff of exhaust gas from a cylinder at the start of the exhaust phase going to the cylinder which is in the terminal exhaust phase and in which the scavenging occurs. In this case, during scavenging, the supercharged non-fuel-containing air inlet valve is open and since the pressure of the exhaust gas puff is greater than the supercharged air pressure, the air inlet is blocked and residual exhaust gases pass into the non-fuel-containing air inlet pipe. These gases in the pipe are then readmitted into the combustion chamber in the intake phase of the engine.

This has the disadvantage of uncontrollably modifying the level of residual gases contained in the combustion chamber and impairing the combustion that occurs subsequently.

To remedy the foregoing, provision is made so that the means commanding the movement of the inlet valves, such as a camshaft, are such that the valve of the non-fuel-containing air intake means can remain constantly closed until the end of the engine exhaust phase to eliminate the overlap phase between the supercharged non-fuel-containing air valve and the exhaust valve. For this purpose, this camshaft has a phase shifter preventing the non-fuel-containing inlet valve from opening until the exhaust valves are closed.

Such a phase shifter has a complicated design, requires precise regulation, and increases the cost of the inlet valve control means.

BRIEF SUMMARY OF THE INVENTION

The goal of the present invention is to remedy the drawbacks referred to above.

Thus, the present invention relates to a method for controlling a supercharged engine, in particular an indirect injection engine, comprising at least one cylinder having a combustion chamber, at least one supercharged fuel-containing air intake means with a supercharged fuel-containing inlet valve, a supercharged non-fuel-containing air intake means with a supercharged non-fuel-containing air inlet valve, and at least one burned gas exhaust means with an exhaust valve, characterized by consisting of:

bringing about, before the exhaust phase of an engine cylinder and in the vicinity of the top dead center, an overlap of the valves by opening the supercharged non-fuel-containing air inlet valve and closing the exhaust valve, commanding an additional blocking means the supercharged non-fuel-containing air intake means so as to admit this supercharged air into the chamber to scavenge the residual burned gases when the pressure of the supercharged non-fuel-containing air is greater than the pressure of the exhaust gases, commanding said additional blocking means so as to close said supercharged non-fuel-containing air intake means when the pressure of the supercharged non-fuel-containing air is less than the pressure of the exhaust gases.

This method can consist of keeping the non-fuel-containing air inlet valve in the open position at least during the entire scavenging operation.

It can consist of closing the non-fuel-containing air inlet valve at the end of the engine intake phase.

Advantageously, it can consist of opening the supercharged fuel-containing air inlet valve when the exhaust valves close.

Preferably, it can consist of keeping the additional blocking means in the open position as long as the pressure of supercharged non-fuel-containing air is greater than the pressure of the exhaust gases.

It can also consist of keeping the additional blocking means in the closed position as long as the pressure of supercharged non-fuel-containing air is less than the pressure of the exhaust gases.

The invention also relates to a supercharged internal combustion engine, particularly an indirect injection engine, having at least one cylinder having a combustion chamber, a supercharged fuel-containing air intake means with a blocking means, a supercharged non-fuel-containing intake means with a blocking means, and at least one burned gas exhaust means, characterized by including an additional means blocking the supercharged non-fuel-containing air intake means.

The additional blocking means can include an articulated valve or flap valve.

The additional blocking means can be controlled by command means.

The command means can include means for evaluating the engine inlet and exhaust pressures.

The blocking means can be commanded by a camshaft that has no phase shifter.

The other features and advantages of the invention will better emerge from reading the following description, provided solely for illustration and not limitative, with reference to the attached drawings of which:

BRIEF DESCRIPTION OF THE DRAWINGS

FIG. 3 is a flow chart showing a method of the present invention.

DETAILED DESCRIPTION OF THE INVENTION

Figure 1:
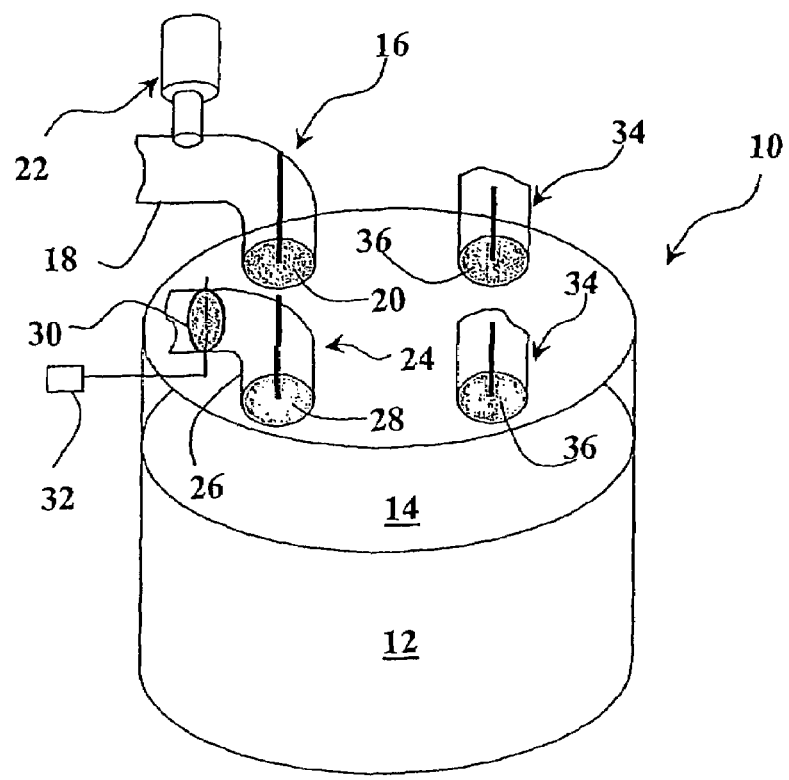
FIG. 1 is a schematic view of an engine according to the invention, showing a plug valve in an open position.

FIG. 1 shows a supercharged internal combustion engine, particularly of the gasoline indirect injection type, in particular with controlled ignition, having at least one cylinder 10, in which slides a piston 12 which delimits, with the upper part of the cylinder, a combustion chamber 14 in which combustion of a mixture of supercharged air and fuel occurs.

The cylinder 10 has a supercharged fuel-containing intake means 16, conventionally formed by an orifice in the cylinder head that this engine generally includes, a pipe 18 communicating with this orifice, and a means 20 for blocking this passage such as a supercharged fuel-containing air inlet valve. A fuel injection means 22 introduces a fuel into pipe 18 so that it mixes with the supercharged air circulating therein. This cylinder also includes a supercharged non-fuel-containing air intake means 24 comprised of an orifice disposed in the cylinder head, a pipe 26 communicating with this orifice, and a means 28 for blocking said passage, such as a supercharged non-fuel-containing air inlet valve. The pipe has an additional blocking means 30 to allow or prevent circulation of supercharged non-fuel-containing air in this pipe. Advantageously, this blocking means is a flap valve articulated around an axis, but any other means such as a plug valve can be envisaged. In a manner known of itself, the engine also has a burned gas exhaust means, in this case two exhaust means 34, controlled by blocking means, for example exhaust valves 36.

Flap valve 30, which is disposed upstream of valve 28, is controlled rotationally about its axis by any command means 32, such as a hydraulic or electrohydraulic activator, or an electrical activator such as a microengine. This control means receives instructions from a central unit (not shown) such as the microengine computer that an engine normally has. This computer includes maps or tables so that at any time it can evaluate the pressure in the intake means 16, 24 and exhaust means 34, particularly as a function of engine speed and/or load. This computer can also receive signals from pressure sensors (not shown) reporting the pressure in these inlet and exhaust means.

The movement of valves 28 and 20 is commanded by a camshaft without a phase shifter but in known fashion having offset cams for controlling the supercharged non-fuel-containing air inlet valve 28 while the exhaust valves 36 are commanded by another conventional camshaft.

At low and medium engine speeds, particularly at high load, the pressure of the supercharged non-fuel-containing inlet air in valve 28 is greater than the pressure of the exhaust gases in exhaust valves 36. This differential allows scavenging of the residual burned gases present in the combustion chamber 14. In this case, to effect this scavenging, the exhaust valves 36 are open and only supercharged non-fuel-containing air is admitted into this combustion chamber, in the vicinity of the top dead center (TDC). This admission is effected, due to intake means 24, by opening the non-fuel-containing air inlet valve 28 and commanding the activator 32 so that the flap valve 30 is moved to its fully open position to open the passage of supercharged non-fuel-containing air in this pipe. If the flap valve 30 is already in its fully open position, no action will be taken by activator 32 so that this valve remains in its fully open position.

Under the effect of the pressure differential between the pressure of the supercharged air and that of the residual burned gases, the latter are expelled from chamber 14 and evacuated through valves 36. Because of this, the space occupied by these burned gases is filled with supercharged air containing no fuel.

As soon as the scavenging of the burned gases is at an end, the exhaust valves 36 are closed, and the inlet valve 28 as well as the flap valve 30 are kept in the open position. Supercharged fuel-containing air is then introduced into the combustion chamber 14 by the opening of valve 20 of the intake means 16 until the end of the engine intake phase.

For greater detail of these configurations, reference will now be made to FIG. 2 which shows the lifts of the exhaust valves 36, the supercharged non-fuel-containing inlet valve 28, and the supercharged fuel-containing inlet valve 20 as well as the position of the flap valve 30 between a closed position (F) and open position (O) of the pipe 26.

Before the end of the engine exhaust phase and at a crankshaft angle $\theta 1$ in the vicinity of the top dead center (TDC), the exhaust valves 36 are still not closed and residual burned gases present in the combustion chamber are scavenged. For this to occur, the non-fuel-containing air inlet valve 28 opens and supercharged non-fuel-containing air is admitted into the combustion chamber. At this angle $\theta 1$, if flap valve 30 is already in the open (O) position, this position is maintained during the engine cycle as long as the pressure of the supercharged non-fuel-containing air is greater than the pressure of the exhaust gases. Conversely, if flap valve 30 is in the closed position (F) at angle $\theta 1$, this valve is toggled into the fully open (O) position of pipe 26 (arrow OT) and is also held in this position as long as the pressure of the supercharged non-fuel-containing air is greater than the pressure of the exhaust gases. In this configuration, supercharged non-fuel-containing air is introduced into the combustion chamber at a higher pressure than that of the residual exhaust gases and these exhaust gases are evacuated through exhaust means to be replaced by supercharged non-fuel-containing air. This scavenging takes place until the exhaust valves 36 are completed closed, at a crankshaft angle $\theta 2$ after the TDC and in the vicinity thereof.

As soon as these exhaust valves close, the supercharged non-fuel-containing air valve 28 is kept in the open position then follows its lift to the vicinity of the bottom dead center (BDC), flap valve 30 stays open, supercharged fuel-containing air inlet valve 20 opens, and supercharged fuel-containing air is introduced into combustion chamber 14 until this valve closes in the vicinity of the bottom dead center (BDC).

At high engine speeds, counterpressure of the exhaust gases occurs at the exhaust valves 36, which produces counter-scavenging in the combustion chamber. This counter-scavenging, which is translated by pressure of the exhaust gases at the exhaust valves 36 that is greater than the pressure of the supercharged non-fuel-containing inlet air at valve 28, prevents scavenging of the residual burned gases present in the combustion chamber. In this case, since the non-fuel-containing air inlet valve 28 is open and to prevent exhaust gases from being introduced into the supercharged non-fuel-containing air inlet pipe, flap valve 30 closes the passage of the supercharged non-fuel-containing air in pipe 26.

Figure 1A:
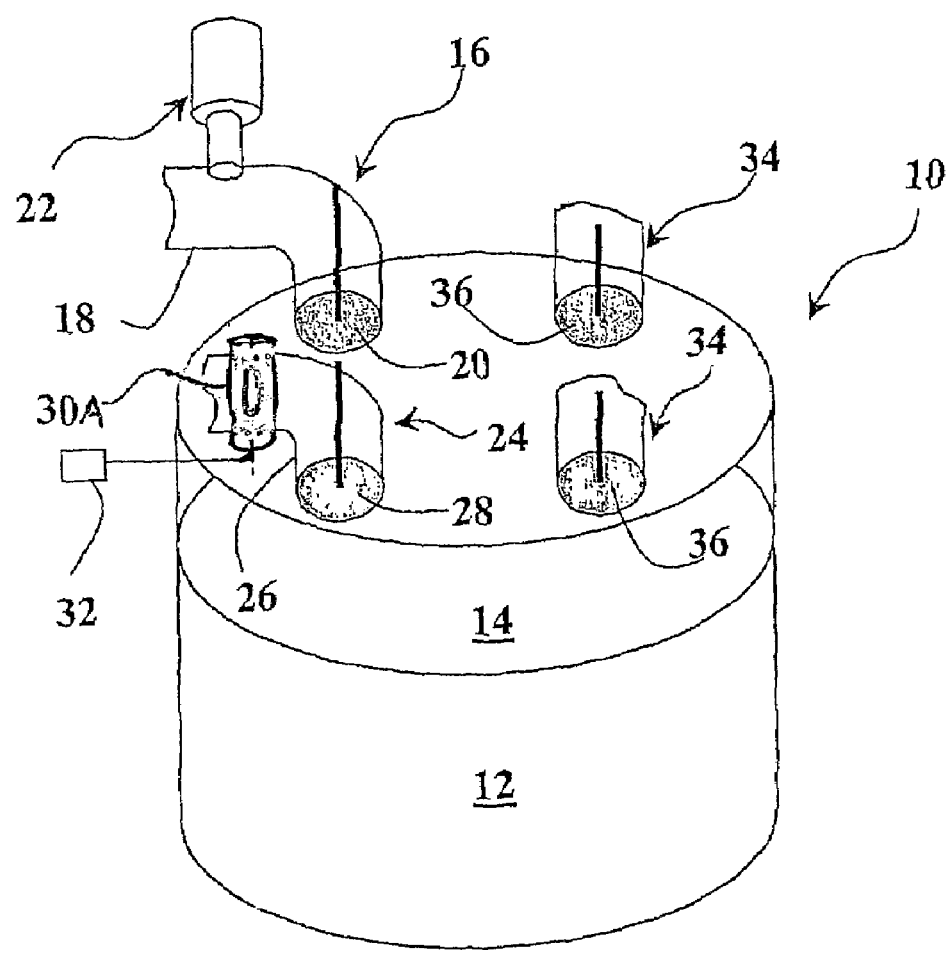
FIG. 1A is a schematic view of an engine according to the invention, showing a plug valve in a closed position.

FIG. 1 is a schematic view of an engine according to the invention, showing a plug valve in an open position, while FIG. 1A is a schematic view of an engine according to the invention, showing a plug valve in a closed position.

Figure 2:
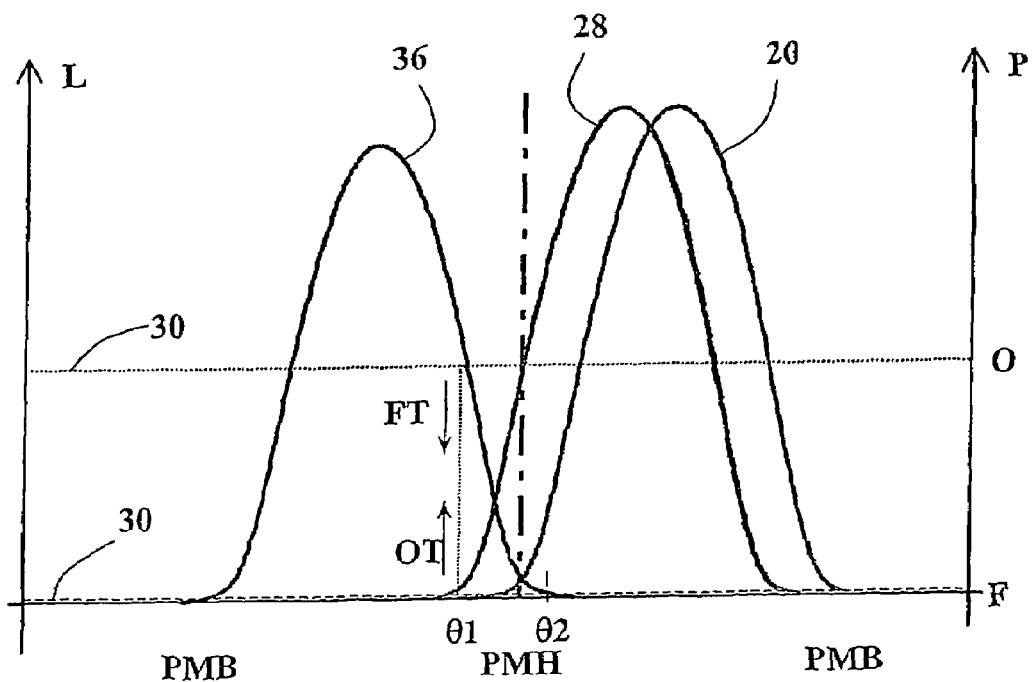
FIG. 2 is a graph showing the curves of the valve lifts (L) and indicating the position (P) of an additional blocking means as a function of the piston position of the engine according to the invention.

With reference to FIG. 2, at crankshaft angle $\theta 1$ in the vicinity of the top dead center (TDC), the exhaust valves 36 are not yet closed and the non-fuel-containing air inlet valve 28 opens. To prevent the counter-scavenging phenomenon, the flan valve 30 is made to close nine 26 so as to prevent any fluid (inlet air or exhaust gas) from circulating. At this angle $\theta 1$, if flan valve 30 is already in the closed (F) position, the latter is kept in this position throughout the period when the pressure of the exhaust gases is greater than the pressure of the supercharged non-fuel-containing air. On the other hand, if valve 30 is in the open (O) position at angle $\theta 1$, this valve is toggled into the fully closed (F) position of pipe 26 (arrow FT) and is also held in this position. In this configuration, supercharged non-fuel-containing air cannot be admitted into chamber 14 and the exhaust gases cannot penetrate into pipe 26.

As in the previous case, as soon as the exhaust valves are closed, the supercharged non-fuel-containing air valve 28 is held in the open position then lifts up to the vicinity of the bottom dead center (BDC) and since valve 30 is in the position in which it fully closes pipe 26, no fluid circulation occurs in this pipe. The supercharged fuel-containing air inlet valve 20 opens and supercharged fuel-containing air is introduced into combustion chamber 14 until this valve closes in the vicinity of the top dead center (TDC).

Thanks to the invention, the valve overlap is thus permanent and the supercharged non-fuel-containing air inlet valve and supercharged fuel-containing air inlet valve are commanded conventionally, without a phase shifter, by any simple device normally used in the field, while preventing any backflow of exhaust gas into the supercharged non-fuel-containing air pipe by means of flap valve 30.

FIG. 3 is a flow chart showing a method of the present invention.

The present invention is not confined to the example described but encompasses all variants and all equivalents.

The invention claimed is:

1. A method for controlling a supercharged engine, in particular an indirect injection engine, the supercharged engine comprising at least a controller and sensors, one cylinder having a combustion chamber, at least one supercharged fuel-containing air intake means with a supercharged fuel-containing inlet valve, a supercharged non-fuel-containing air intake means with a supercharged non-fuel-containing air inlet valve, and at least one burned gas exhaust means with an exhaust valve, the method comprising:

determining an overlap of the valves by opening the supercharged non-fuel-containing air inlet valve and closing the exhaust valve before the exhaust phase of an engine cylinder and in the vicinity of the top dead center (TDC);

actuating a blocking means for blocking the supercharged non-fuel-containing air intake means to admit supercharged air flowing in the supercharged non-fuel-containing air intake means into the chamber to scavenge residual burned gases when a pressure of the supercharged non-fuel-containing air is greater than a pressure of the exhaust gases; and actuating the blocking means to shut off the supercharged air flowing from the supercharged non-fuel-containing intake means into the chamber when pressure of the supercharged non-fuel-containing air is less than pressure of the exhaust gases.

2. The method according to claim 1, further comprising keeping the supercharged non-fuel-containing air inlet valve in the open position at least during the scavenging of the residual burned gases.

3. The method according to claim 1, further comprising closing the supercharged non-fuel-containing air inlet valve at the end of admitting supercharged air into the chamber.

4. The method according to claim 1, further comprising opening the supercharged non-fuel-containing air inlet valve when exhaust valve closes.

5. The method according to claim 1, further comprising keeping the blocking means in the open position as long as the pressure of supercharged non-fuel-containing air is greater than the pressure of the exhaust gases.

6. The method according to claim 1, further comprising keeping the blocking means in the closed position as long as the pressure of supercharged non-fuel-containing air is less than the pressure of the exhaust gases.

7. A method for controlling a supercharged engine, in particular an indirect injection engine, the supercharged engine comprising at least a controller and sensors, one cylinder having a combustion chamber, at least one supercharged fuel-containing air intake means with a supercharged fuel-containing inlet valve, a supercharged non-fuel-containing air intake means with a supercharged non-fuel-containing air inlet valve, and at least one burned gas exhaust means with an exhaust valve, the method comprising:

determining an overlap of the valves by opening the supercharged non-fuel-containing air inlet valve and closing the exhaust valve before the exhaust phase of an engine cylinder and in the vicinity of the top dead center (TDC);

opening a blocking means for blocking the supercharged non-fuel-containing air intake means to admit supercharged air flowing in the supercharged non-fuel-containing air intake means into the chamber to scavenge residual burned gases when a pressure of the supercharged non-fuel-containing air is greater than a pressure of the exhaust gases; and closing the blocking means to close the supercharged air flowing from the supercharged non-fuel-containing intake means into the chamber when pressure of the supercharged non-fuel-containing air is less than pressure of the exhaust gases.

\* \* \* \* \*